United States Patent
Al-Dulaimi et al.

(10) Patent No.: US 11,856,426 B2
(45) Date of Patent: Dec. 26, 2023

(54) NETWORK ANALYTICS

(71) Applicant: EXFO Solutions SAS, Saint-Jacques-de-la-Lande (FR)

(72) Inventors: Anwer Al-Dulaimi, Montréal (CA); Stéphane Lagain, Rennes (FR); Fabrice Bonnaud, Rennes (FR)

(73) Assignee: EXFO Solutions SAS, Saint-Jacques-de-la-Lande (FR)

(*) Notice: Subject to any disclaimer, the term of this patent is extended or adjusted under 35 U.S.C. 154(b) by 312 days.

(21) Appl. No.: 17/229,057

(22) Filed: Apr. 13, 2021

(65) Prior Publication Data

US 2021/0329479 A1  Oct. 21, 2021

Related U.S. Application Data

(60) Provisional application No. 63/010,343, filed on Apr. 15, 2020.

(30) Foreign Application Priority Data

Aug. 24, 2020 (GB) .................................... 2013187

(51) Int. Cl.
*H04W 24/08* (2009.01)
*G06N 20/00* (2019.01)
(Continued)

(52) U.S. Cl.
CPC ............ *H04W 24/08* (2013.01); *G06N 20/00* (2019.01); *H04L 41/0631* (2013.01);
(Continued)

(58) Field of Classification Search
CPC ..... H04W 24/08; H04W 24/04; H04W 24/10; G06N 20/00; H04L 41/0631; H04L 41/12
See application file for complete search history.

(56) References Cited

U.S. PATENT DOCUMENTS 9,424,121 B2  8/2016  Kushnir et al.
9,838,272 B2  12/2017  Djukic et al.
(Continued)

FOREIGN PATENT DOCUMENTS

WO  2013044974 A1  4/2013
WO  2015/065368 A1  5/2015
(Continued)

OTHER PUBLICATIONS

Hunt et al., "End-toEnd Network Service Lifecycle Demonstration," IEEE Conference on Network Function Virtualization and Software Defined Networks 2015 Demo Track, pp. 9-12.
(Continued)

*Primary Examiner* — Natasha W Cosme
(74) *Attorney, Agent, or Firm* — Baratta Law PLLC; Lawrence A. Baratta, Jr.

(57) ABSTRACT

An apparatus, method and computer program is described, comprising: obtaining analytics data from one or more network data analytics functions of a mobile communication system using a probe network function which subscribes to the network data analytics functions; obtaining control plane data from one or more control plane probes, wherein the control plane data comprises signaling between one or more user devices and a network of the mobile communication system; obtaining user plane data from one or more user plane probes; processing the analytics data, control plane data and user plane data, including correlating at least some of said analytics, user plane and control plane data and identifying at least one anomaly in said data; and triggering an active mode to acquire a subset of analytics data related to said at least one anomaly.

20 Claims, 12 Drawing Sheets

(51) Int. Cl.
| | |
|---|---|
| *H04L 41/0631* | (2022.01) |
| *H04L 41/12* | (2022.01) |
| *H04W 24/04* | (2009.01) |
| *H04W 24/10* | (2009.01) |

(52) U.S. Cl.
CPC ............ *H04L 41/12* (2013.01); *H04W 24/04* (2013.01); *H04W 24/10* (2013.01)

(56) References Cited

U.S. PATENT DOCUMENTS

| | | | |
|---|---|---|---|
| 9,918,239 | B2 | 3/2018 | Thomas et al. |
| 10,142,889 | B2 | 11/2018 | Dao |
| 10,313,997 | B2 | 6/2019 | Singh et al. |
| 10,348,517 | B2 | 7/2019 | McNamee et al. |
| 10,448,320 | B2 | 10/2019 | Vrzic et al. |
| 10,505,870 | B2 | 12/2019 | Cui et al. |
| 10,581,984 | B2 | 3/2020 | Livanos et al. |
| 10,721,144 | B2 | 7/2020 | Malboubi et al. |
| 10,785,634 | B1 | 9/2020 | Fiorese et al. |
| 10,841,974 | B1 | 11/2020 | Young et al. |
| 10,892,958 | B2 | 1/2021 | Bor-Yaliniz et al. |
| 10,911,326 | B2 | 2/2021 | Han et al. |
| 11,012,294 | B2 | 5/2021 | Ratnasamy et al. |
| 2012/0317276 | A1* | 12/2012 | Muniraju ............... H04L 41/14 709/224 |
| 2013/0258865 | A1 | 10/2013 | Kovvali et al. |
| 2016/0212017 | A1 | 7/2016 | Li et al. |
| 2016/0359682 | A1 | 12/2016 | Senarath et al. |
| 2017/0317894 | A1 | 11/2017 | Dao et al. |
| 2018/0262924 | A1 | 9/2018 | Dao et al. |
| 2018/0367373 | A1 | 12/2018 | Chou |
| 2019/0037409 | A1 | 1/2019 | Wang et al. |
| 2019/0109768 | A1 | 4/2019 | Senarath et al. |
| 2019/0215730 | A1 | 7/2019 | Qiao et al. |
| 2019/0222489 | A1 | 7/2019 | Shan et al. |
| 2019/0253917 | A1 | 8/2019 | Dao et al. |
| 2019/0268777 | A1 | 8/2019 | Simon et al. |
| 2019/0356558 | A1* | 11/2019 | Han ....................... H04L 41/14 |
| 2019/0380037 | A1* | 12/2019 | Lifshitz .................. G06N 20/20 |
| 2019/0394655 | A1 | 12/2019 | Rahman et al. |
| 2020/0022016 | A1 | 1/2020 | Fenoglio et al. |
| 2020/0042365 | A1 | 2/2020 | Tanna et al. |
| 2020/0044943 | A1 | 2/2020 | Bor-Yaliniz et al. |
| 2020/0106812 | A1 | 4/2020 | Verma et al. |
| 2020/0112868 | A1 | 4/2020 | Shariat et al. |
| 2020/0112907 | A1 | 4/2020 | Dao et al. |
| 2020/0112921 | A1 | 4/2020 | Han et al. |
| 2020/0296603 | A1 | 9/2020 | Suthar et al. |
| 2021/0021494 | A1 | 1/2021 | Yao et al. |
| 2021/0058323 | A1 | 2/2021 | Thanneeru et al. |
| 2021/0105665 | A1 | 4/2021 | Bennett et al. |
| 2021/0211452 | A1* | 7/2021 | Patel ................... H04L 63/1416 |

FOREIGN PATENT DOCUMENTS

| | | |
|---|---|---|
| WO | 2018215046 A1 | 11/2018 |
| WO | 2019231435 A1 | 5/2019 |
| WO | 2019196796 A1 | 10/2019 |
| WO | 2019197467 A1 | 10/2019 |
| WO | 2019231435 A1 | 12/2019 |
| WO | 2019246530 A1 | 12/2019 |
| WO | 2020001795 A1 | 1/2020 |
| WO | 2020018012 A1 | 1/2020 |
| WO | 2020031158 A1 | 2/2020 |
| WO | 2020032769 A1 | 2/2020 |
| WO | 2020061312 A1 | 3/2020 |
| WO | 2020074092 A1 | 4/2020 |
| WO | 2020173580 A1 | 9/2020 |

OTHER PUBLICATIONS

Karapantelakis et al., "DevOps for IoT Applications using Cellular Networks and Cloud," 2016 IEEE 4th International Conference of Future Internet of Things and Cloud, pp. 340-347.

Aug. 4, 2021, European Search Reported issued for European Patent Application No. EP 21 16 4892.

ETSI TS 129 520 V15.3.0, 5G; 5G System; Network Data Analytics Services; Stage 3 (3GPP TS 29.520 version 15.3.0 Release 15), Apr. 2019. pp. 1-39.

Garcia et al., "Big data analytics for automated QoE management in mobile networks," IEEE Communications Magazine, Aug. 2019, pp. 1-7.

Kaloxylos et al., "Application of Data Mining in the 5G Network Architecture," ICDT 2018 : The Thirteenth International Conference on Digital Telecommunications, ISBN: 978-1-61208-623-1, pp. 39-44.

Feb. 25, 2021, Combined Search and Examination Report under Sections 17 and 18(3) for Application No. GB2013187.6, pp. 1-6.

Radcom, "Delivering a Superior Customer Experience for 5G," pp. 1-30.

Radcom, "Network Data Analytics Function," Radcom's NWDAF solution correlates multiple data sources to ensure a high customer experience for 5G, Mar. 31, 2020, pp. 1-7.

Radcom, "Radcom's Network Data Analytics Function (NWDAF) Data analytics and containerized service assurance for 5G," Jun. 2020, pp. 1-15.

Mayer, "RESTful APIs for the 5G Service Based Architecture," 2018, pp. 101-116.

Sandvine, "Sandvine to Showcase New Portfolio of Active Network Intelligence Use Cases at Mobile World Congress: Unveiling new version of eVolution virtual analytics probe targeted at 5G Network Data Analytics," Feb. 21, 2018, pp. 1-3.

Barmpounakis et al., "Data Analytics for 5G Networks: A Complete Framework for Network Access Selection and Traffic Steering," International Journal on Advances in Telecommunications, vol. 11 No. 3 & 4, year 2018, http://www.iariajournals.org/telecommunications/, pp. 101-114.

Toosi et al., "Management and Orchestration of Network Slices in 5G, Fog, Edge and Clouds," Chapter 4, pp. 1-31.

Afolabi et al., "Network Slicing and Softwarization: A Survey on Principles, Enabling Technologies, and Solutions," IEEE Communications Surveys & Tutorials, vol. 20, No. 3, Mar. 21, 2018, pp. 2429-2453.

Santos et al., "Selfnet Framework self-healing capabilities for 5G mobile networks," Open Access, DOI: 10.1002/ett.3049, Sep. 30, 2016.

Casellas et al., "Enabling Data Analytics and Machine Learning for 5G Services within Disaggregated Multi-Layer Transport Networks," IEEE, Jul. 1, 2018.

Corici et al., "Practical Performance Degradation Mitigation Solution using Anomaly Detection for Carrier-Grade Software Networks," 2018 IEEE Conference on Standards for Communications and Networking (CSCN), Dec. 20, 2018.

Pateromichelakis et al., "End-to-End Data Analytics Framework for 5G Architecture," IEEE Access, vol. 7, 2019, Mar. 5, 2019, pp. 40295-40312.

ZTE, "Some corrections to Nnwdaf_AnalyticsInfo Service," 3GPP Draft, C3-202053, 3GPP TSG WG3 Meeting #109e, Apr. 16-24, 2020, 9 pages.

Sep. 10, 2021, European Search Report for European Application No. EP 21 16 8043.

Non-Final Office Action, U.S. Appl. No. 17/209,370, dated Dec. 24, 2021, 14 pages.

Jul. 12, 2022, European Search Report issued for European Patent Application No. EP 22 16 9188.

3GPP, "3rd Generation Partnership Project; Technical Specification Group Services and System Aspects; Study of Enablers for Network Automation for 5G," 3GPP TR 23.791 v1.1.0, Nov. 3, 2018, pp. 1-97.

Nokia et al., "Soution to Key Issue #6: NWDAF analytics usage for UPF selection," 3GPP TSG-SA WG2 Meeting #129, S2-1810737, Oct. 15-19, 2018, 2 pgs.

Tencent et al., "NRF Registration and Discovery Service Update," SA WG2 Meeting #133, S2-1905153, May 13-17, 2019, 5 pgs.

(56) References Cited

OTHER PUBLICATIONS

Al-Dulaimi et al., IEEE Vehicular Technology Magazine, "Interfacing 5G Orchestrators With Data Analytics Functions," Jun. 2020, pp. 18-20.
Mouchili et al., Rightslink, "Call Data Record based Big Data Analytics for Smart Cities," 2019, pp. 1-7.
Pateromichelakis et al., IEEE Access, "End-to-End Data Analytics Framework for 5G Architecture," vol. 7, 2019, pp. 40295-40312.
Sajjad et al., "Inter-Slice Mobility Management in 5G: Motivations, Standard Principles, Challenges and Research Directions," Submitted to IEEE for Possible Publication, Mar. 2020, pp. 1-7.
Han et al., "Admission and Congestion Control for 5G Network Slicing," IEEE, 2018, pp. 1-6.

* cited by examiner

NETWORK ANALYTICS

CROSS-REFERENCE

The present application/patent claims priority to U.S. Patent Application No. 63/010,343, filed Apr. 15, 2020, and to UK PATENT APPLICATION NUMBER 2013187.6, filed Aug. 24, 2020, the contents of both are incorporated by reference in their entirety.

FIELD

The present specification relates to network analytics in mobile communication systems, such as 5G networks.

BACKGROUND

Although the capture of data for use in data analytics for mobile communication systems is known, the evolution of new network technologies imposes evolving architectures used to monitor traffic failures. There therefore remains a need for further developments in this field.

SUMMARY

In a first embodiment, this specification describes a network monitoring method comprising: obtaining analytics data (e.g. receiving analytics IDs) from one or more network data analytics functions (e.g. one or more NWDAFs) of a mobile communication system using a probe network function which subscribes to the network data analytics functions; obtaining control plane data (e.g. receiving call data records) from one or more control plane probes (e.g. N1/N2 and service based infrastructure (SBI) interfaces of said mobile communication system), wherein the control plane data comprises signaling between one or more user devices and a network of the mobile communication system; obtaining user plane data (e.g. receiving evolved session data records) from one or more user plane probes (e.g. from one or more of N3 and N4 interfaces of said mobile communication system); processing the analytics data, control plane data and user plane data, including correlating at least some of said analytics, user plane and control plane data and identifying at least one anomaly in said data (for example by identifying differences between at least some of the analytics data, user plane data and control plane data indicative of an anomaly); and triggering an active mode to acquire a subset of analytics data related to said at least one anomaly. The mobile communication system may be a 5G mobile communication system.

The method may further comprise: determining a root cause of said at least one anomaly using said subset of analytics data. Further, the method may further comprise: creating a relevant network topology map using said subset of analytics data and said obtained control plane data and user plane data; and determining a root cause of said at least one anomaly using said subset of analytics data and said network topology map. The said root cause may be defined as which network function and associated topology caused the at least one anomaly.

Processing said analytics data, control plane data and user plane data may include using one or more machine-learned algorithms.

The method may comprise providing processed analytics data, control plane data and user plane data to a dashboard.

The said analytics data may provide insights from inside the 5G core. Alternatively, or in addition, the control plane data and the user plane data may provide insight from outside the 5G core.

The method may further comprise determining which users were impacted by said at least one anomaly.

The obtained analytics data, control plane data and user plane data may be provided to a data pool for processing.

Obtaining said analytics data may include receiving messages from one or more of said network data analytics functions. Each message may, for example, include one or more of: slice identity, instance identity, load related performance, NF resource usage status, UE information, etc.

Obtaining said analytics data may include receiving information about events from the one or more network data analytics functions from a network exposure function. Alternatively, or in addition, obtaining said analytics data may include extracting said analytics data from communications sent from said one or more network data analytics functions to other modules of the mobile communication system over an internal core messaging bus. The method may include identifying analytics data on said core messaging bus.

Obtaining said analytics data may include obtaining network data analytics function data sent from the one or more network data analytics functions to: a policy control function of the mobile communication system and/or a network service slice function of the mobile communication system.

The acquired subset of analytics in the active made may allow the AI monitoring system to determine a source of the anomaly (e.g. to decide if a particular anomaly was IT related or originated from the telecom system).

In a second embodiment, this specification describes an apparatus comprising a data processor for processing analytics data, control plane data and user plane data of a mobile communication system (e.g. a 5G mobile communication system), including correlating at least some of said analytics, user plane and control plane data, identifying at least one anomaly in said data and triggering an active mode to acquire a subset of analytics data related to said at least one anomaly, wherein: the analytics data are obtained from one or more network data analytics functions of the mobile communication system using a probe network function which subscribes to the network data analytics functions; the control plane data are obtained from one or more control plane probes, wherein the control plane data comprises signaling between one or more user devices and a network of the mobile communication system; and the user plane data are obtained from one or more user plane probes. The data processor may be further configured to determine a root cause of said at least one anomaly using said subset of analytics data.

The apparatus may further comprise a data pool for collecting said obtained analytics data, control plane data and user plane data for processing by said data processor.

The apparatus may further comprise a dashboard for outputting processed analytics data, control plane data and user plane data.

The apparatus may further comprise one or more control plane probes for obtaining said control plane data from one or more of N1/N2 and SBA or SBI interfaces of said mobile communication system. Alternatively, or in addition, the apparatus may comprise one or more user plane probes for obtaining said user plane data from one or more of N3 and N4 interfaces of said mobile communication system.

The acquired subset of analytics in the active made may allow the AI monitoring system to determine a source of the anomaly (e.g. to decide if a particular anomaly was IT related or originated from the telecom system).

In a third embodiment, this specification describes an apparatus comprises means for performing any method as described with reference to the first embodiment.

In a fourth embodiment, this specification describes computer-readable instructions which, when executed by computing apparatus, cause the computing apparatus to perform (at least) any method as described with reference to the first embodiment.

In a fifth embodiment, this specification describes a computer-readable medium (such as a non-transitory computer-readable medium) comprising program instructions stored thereon for performing (at least) any method as described with reference to the first embodiment.

In a sixth aspect, this specification describes an apparatus comprising: at least one processor; and at least one memory including computer program code which, when executed by the at least one processor, causes the apparatus to perform (at least) any method as described with reference to the first embodiment.

In a seventh embodiment, this specification describes a computer program comprising instructions for causing an apparatus to perform at least the following: obtain analytics data from one or more network data analytics functions of a mobile communication system using a probe network function which subscribes to the network data analytics functions; obtain control plane data from one or more control plane probes, wherein the control plane data comprises signaling between one or more user devices and a network of the mobile communication system; obtain user plane data from one or more user plane probes; process the analytics data, control plane data and user plane data, including correlating at least some of said analytics, user plane and control plane data and identifying at least one anomaly in said data; and trigger an active mode to acquire a subset of analytics data related to said at least one anomaly.

In an eighth embodiment, this specification describes an apparatus comprising means (such as a data unit or a processing unit) for obtaining analytics data from one or more network data analytics functions (e.g. NWDAFs) of a mobile communication system (e.g. a 5G mobile communication system) using a probe network function which subscribes to the network data analytics functions; means (such as the data unit or processing unit) for obtaining control plane data from one or more control plane probes, wherein the control plane data comprises signaling between one or more user devices and a network of the mobile communication system; means (such as the data unit or processing unit) for obtaining user plane data from one or more user plane probes; means (such as the processing unit) for processing the analytics data, control plane data and user plane data, including correlating at least some of said analytics, user plane and control plane data and identifying at least one anomaly in said data; and means (such as the processing unit) for triggering an active mode to acquire a subset of analytics data related to said at least one anomaly.

BRIEF DESCRIPTION OF THE DRAWINGS

Example embodiments will now be described, by way of example only, with reference to the following schematic drawings, in which.

DETAILED DESCRIPTION

Figure 1:
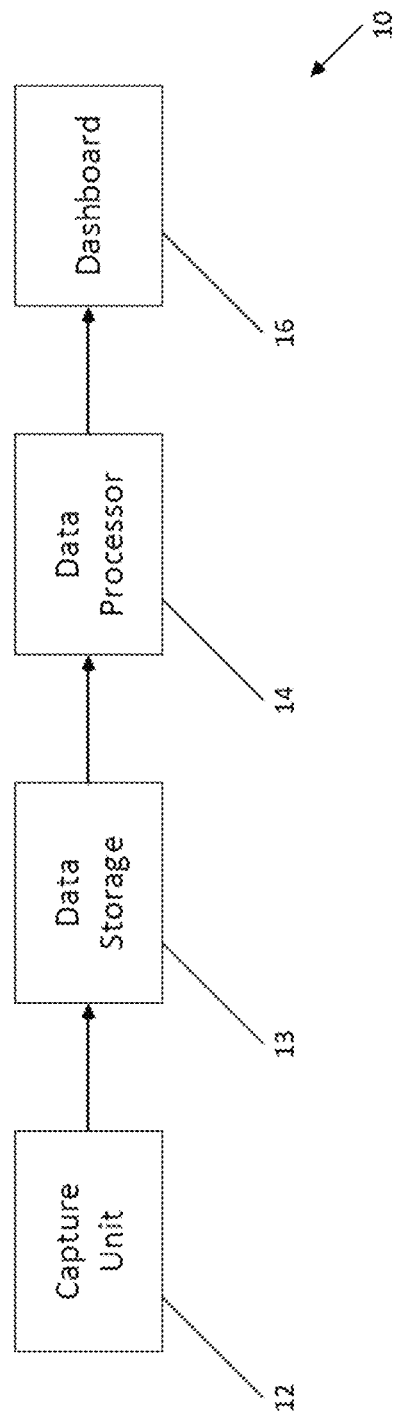
FIG. 1 is a block diagram of a high-level architecture of a system in accordance with an example embodiment.

The scope of protection sought for various embodiments of the invention is set out by the independent claims. The embodiments and features, if any, described in the specification that do not fall under the scope of the independent claims are to be interpreted as examples useful for understanding various embodiments of the invention.

In the description and drawings, like reference numerals refer to like elements throughout.

The present describes the next generation of network monitoring solutions that comply with various network architectures for 5G and beyond. The example embodiments define the techniques used for collecting various counters and analytics along with possible use case scenarios.

FIG. 1 is a block diagram of a system, indicated generally by the reference numeral 10, in accordance with an example embodiment.

The system 10 comprises a capture unit 12, a data storage unit 13, a data processor 14 and a dashboard 16. The capture unit 12 consists of multiple capturing components with different techniques to obtain data from a mobile communication network that is to be processed by the data processor 14. The captured data is stored using the data storage unit 13. Processed data is provided to the dashboard 16, for example for presentation to a user.

In the case of a 5G network, the data that can be captured by probes can be limited, for example due to intensive cyphering within the 5G network or because the 5G core is subject to the impact of a cloud domain. Therefore, the capture unit 12 uses a combination of passive probes and probe network functions (NFs) (or an analytics capture unit in a lab environment) to collect data from various mobile communication network segments and ingest the data into storage unit 13. The data processor 14 uses the pooled analytics data to generate indicators for display using the dashboard 16.

The monitoring solution can take many forms, such as a hardware unit, commercial off-the-shelf (COTS) software, or automated cloud-native virtualized network functions (VNF) in NFV domain.

Figure 2:
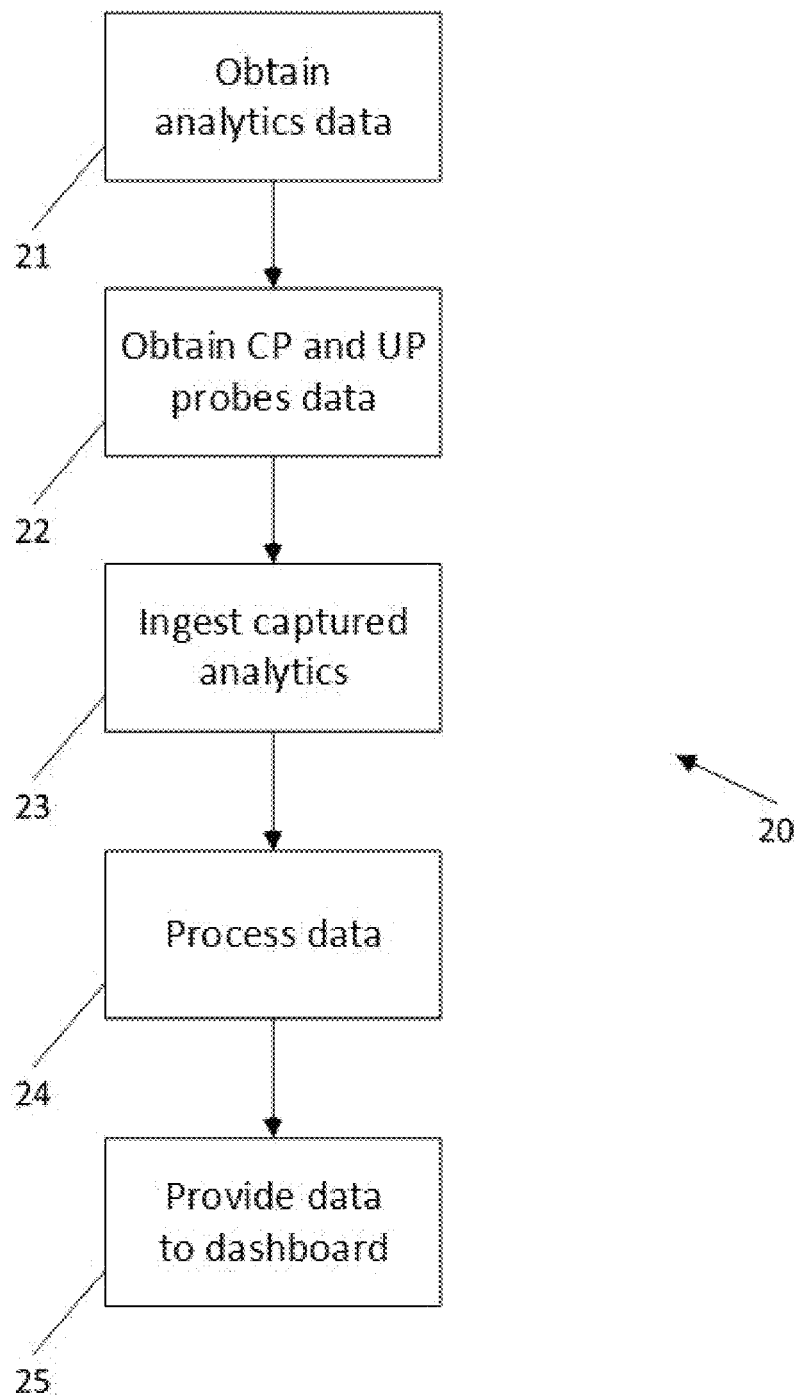
FIG. 2 is a flow chart showing a method in accordance with an example embodiment.

FIG. 2 is a flow chart showing a method, indicated generally by the reference numeral 20, in accordance with an example embodiment, for parsing the various counters and analytics from mobile communication network segments.

The method 20 starts at operation 21, where analytics data is obtained from one or more network data analytics functions (NWDAFs) of a mobile communication system (e.g. a 5G system). The analytics data obtained in the operation 21 may take the form of key performance indicators (KPIs) such as load level, although other analytics data (e.g. key quality indicators, KQI) may be obtained. The analytics data obtained in the operation 21 may take the form of analytics IDS.

At operation 22, control plane data (e.g. in the form of call data records (CDRs)) is obtained from one or more control plane probes and user plane data (e.g. in the form of evolved session data records (eSDRs)) is obtained from one or more user plane probes. The control plane data may comprise signaling between one or more user devices and a network of the mobile communication system. The control plane data may be enriched with subscriber information. The user plane data may include the output of deep packet inspection to understand the nature of the data transferred.

The operations 21 and 22 of the method 20 may be implemented using the capture unit 12 of the system 10.

At operation 23, the analytics data, control plane data and user plane data are ingested into a single data pool (such as the data storage unit 13 of the system 10).

At operation 24, the captured data is processed (for example using the data processor 14 of the system 10). In the operation 24, the processing may include correlating at least some of said analytics, user plane and control plane data (such as correlating actions and events from one or more cores of the mobile communication system) and identifying actual or potential anomalies (e.g. user-impacting events) in captured data. The anomalies could include functional or operational failures in one or more network functions or connected users. The process may determine one or more of who is impacted by an anomaly, where the anomaly occurs, and the duration of the anomaly occurrence. As discussed in detail below, processing the captured data may include determining a root cause of said at least one anomaly.

At operation 25, the processed data may be provided to a dashboard (e.g. the dashboard 16). The dashboard(s) may enable visualization of the network status and may enable configuration of the system.

In order to implement the method 20, control plane (CP) probe(s) may be used to generate call data records (CDRs), user plane (UP) probe(s) may be used to generate evolved session data records (eSDRs) and active probe network functions may be used to generate analytics IDs.

There could be multiple probes and network functions which monitor the network status. The techniques used for deploying the monitoring solution as a whole may differ from one deployment to another subject to operator requirements and the design of their networks infrastructure.

A number of implementations of the active probe network function are possible; some example embodiments are discussed further below.

Figure 3:
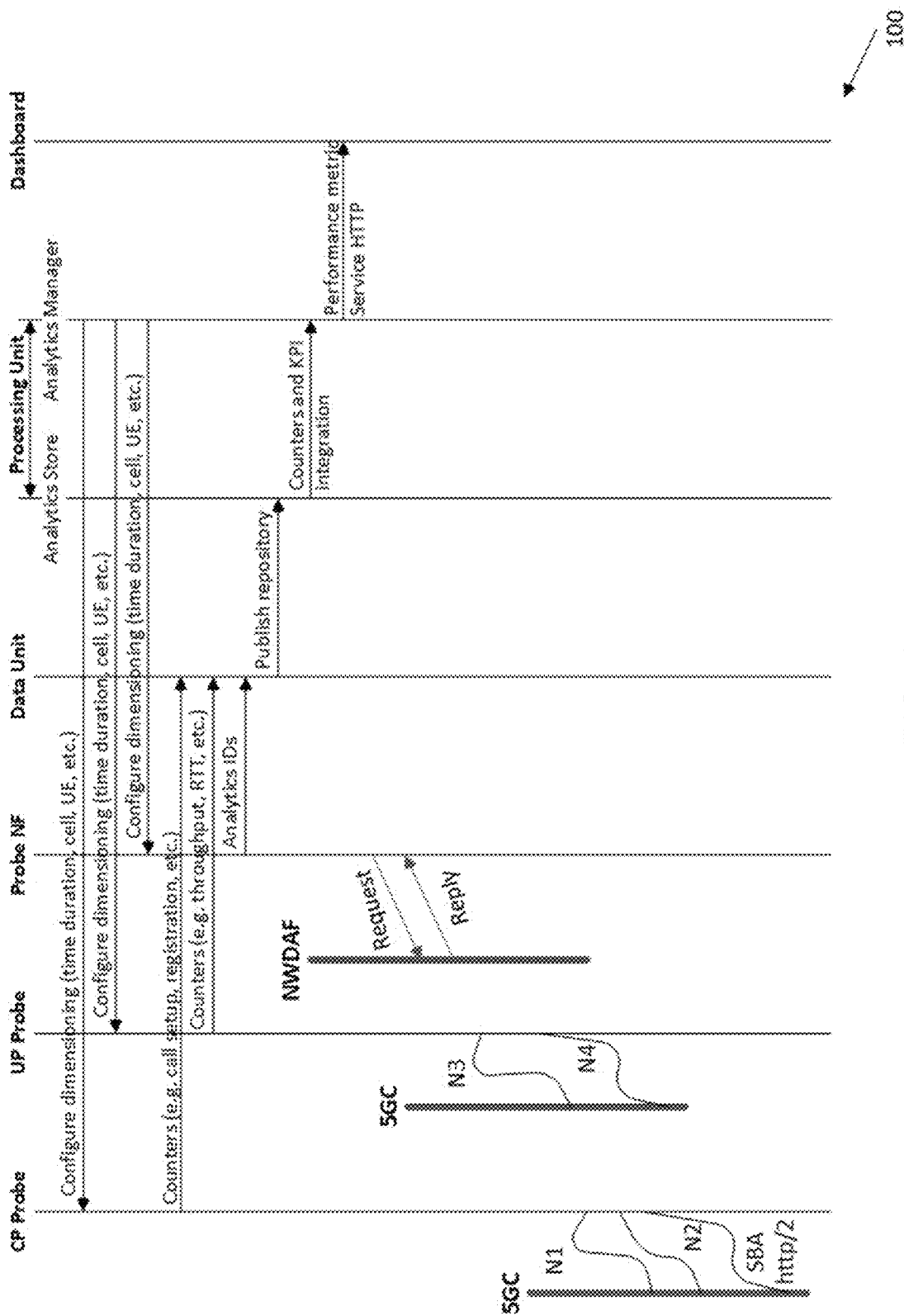
FIG. 3 is a signaling diagram in accordance with an example embodiment.

FIG. 3 is a signaling diagram, indicated generally by the reference numeral 100, in accordance with an example embodiment. The signaling diagram 100 shows the signaling messages that are exchanged within the monitoring solution to coordinate the operation of a control plane (CP) probe, a user plane (UP) probe, a probe network function (NF), a data unit, an analytics store, an analytics manager and a dashboard.

The CP probe, UP probe and probe NF form the capture unit 12 of the system 10 described above and may be used to implement the operations 21 and 22 of the method 20).

The captured data is ingested into the data unit (that forms the data storage unit 13 of the system 10), thereby implementing operation 23 of the method 20. The analytics store and analytics manager collectively form the data processor 14 of the system 10 and can be used to implement the operation 24 of the method 20. The dashboard shown in FIG. 2 is the dashboard 16.

As shown in example signaling diagram 100, the CP probe receives data from the N1/N2 and SBA or SBI interfaces of a 5G communication system, the UP probe receives data from the N3 and N4 interfaces of the 5G communication system and the probe NF receives data from a Network Data Analytics Functions Service (NWDAF) of the 5G network core. Further details of these interfaces are provided below.

As shown in the signaling diagram 100, the analytics manager (that forms part of the data processor 14) provides configuring messages to the CP probe, the UP probe and the probe NF.

The CP probe provides counters (e.g. call setup data, registration data etc.) to the data unit. Similarly, the UP probe provides counters (e.g. throughput, round trip time (RTT) data etc.) to the data unit. Finally, the probe NF provides analytics identifiers (e.g. core NFs status, congestion events, NFs failure events, etc.) to the data unit.

The data ingested into the data unit is published to the analytics store of the data processor 14. The data processor processes the data ingested into the data unit and provides performance metrics and other data for display by the dashboard.

Figure 4:
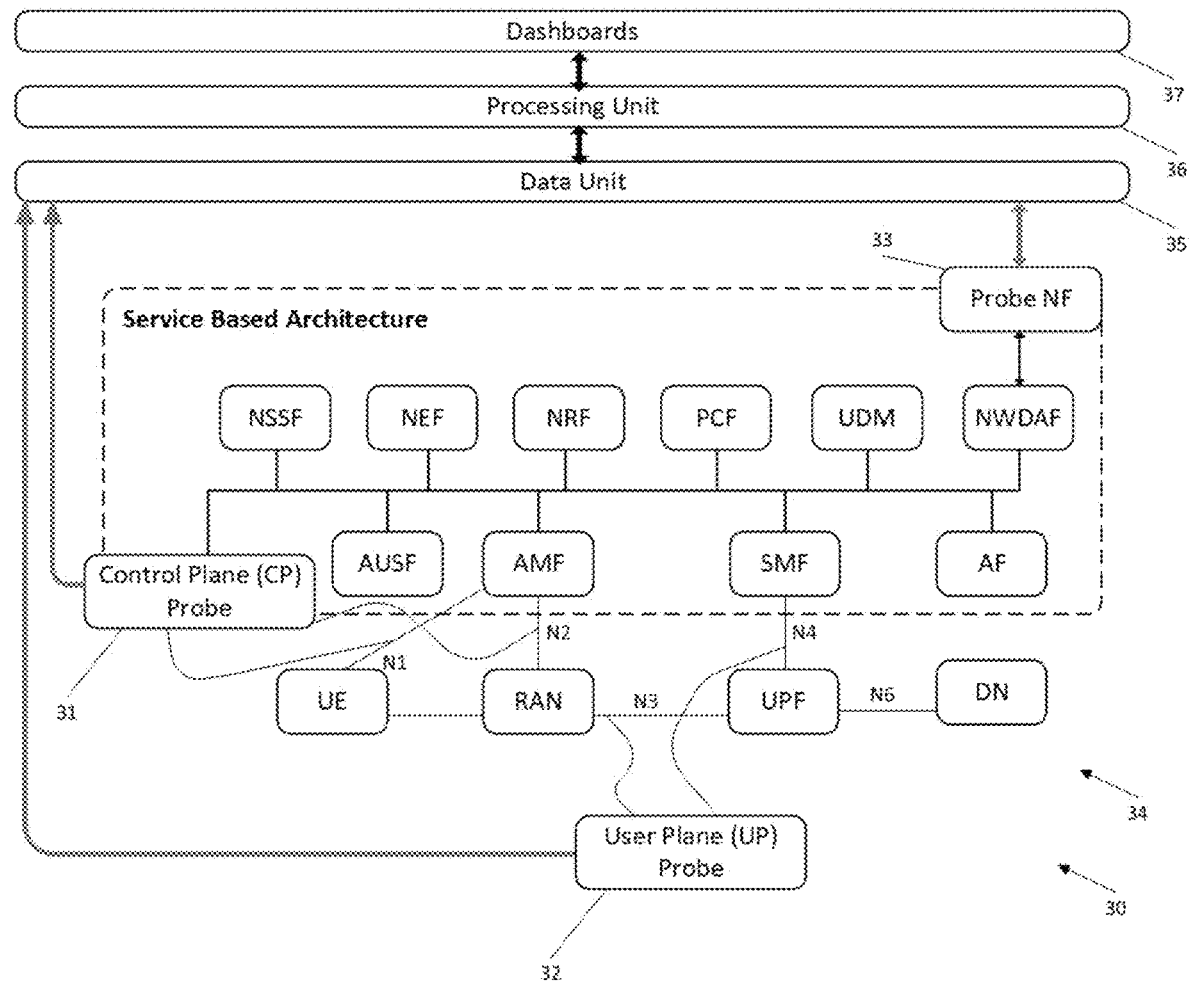
FIGS. 4 to 10 are block diagrams of systems in accordance with example embodiments.

FIG. 4 is a block diagram of a system, indicated generally by the reference numeral 30, in accordance with an example embodiment. The system 30 is an example implementation of the system 10 and may be used to implement the method 20 and the signaling described above with reference to the signaling diagram 100. The system 30 applies to 5G service-based architecture (SBA) situations.

The system 30 comprises a control plane (CP) probe 31, a user plane (UP) probe 32 and an active probe network function 33 that collectively form a capture unit (such as the capture unit 12 described above). A 5G network is indicated generally by the reference numeral 34. The system 30 further comprises a data unit 35 and processing unit 36 that collectively form a data processor (such as the data processor 14 described above) and one or more dashboards 37 that are examples of the dashboard 16.

The control plane probe 31 captures the control messages between the UE/RAN and the 5G core network of the 5G network. As shown in the system 30 (and in the signaling diagram 100), the control plane probe may receive data from the N1/N2 and SBA or SBI interfaces of the communication system.

The control plane (CP) probe 31 mirrors all packets and can decipher the NAS to enrich the obtained data with obtain subscriber information. The control plane probe generates call data records (CDRs) that are ingested into the processing unit for troubleshooting issues on the network to seek to identify root causes.

The user plane (UP) probe 32 captures the user plane data along with packet directions, quality of service (e.g. QFI) indicators, etc. The user plane probe 32 generates evolved session data records (eSDRs) that are ingested into the processing unit 36 for troubleshooting issues on the network 34 and to identify root causes. The user plane probe 32 can implement deep packet inspection (DPI) to look at payload contents and understand the type of data transferred.

The active probe network function 33 obtains analytics from one or more Network Data Analytics Functions Services (NWDAFs), as discussed in detail below. The network function 33 may issue requests to an NWDAF to provide a set of analytics, a report on analytics period, or other types of analytics. The active probe network function 33 is a network function that complies with cloud-native domain specifications and resides in the virtual domain along with the 5G core network.

The active probe network function 33 may have two different modes of operation: passive and active. The passive mode is the default mode for the monitoring system. The active mode is activated once an anomaly is found in the obtained analytics to parse more data that help identify the root cause. Once the network error is identified, the monitoring system switches back to passive mode.

In regular passive mode, the network function 33 subscribes to one or more NWDAFs to obtain all available analytics and ingest them into the processing unit 36.

Once a network error has been identified by the processing unit 36, processing unit 36 will trigger the active mode operation, where certain analytics sets are requested by the network function 33 from the NWDAF(s). The processing unit 36 sends this request in form of commands provided with certain network function or event. When UE information is transmitted in clear format, the NWDAF may use the SUPI or IMSI identifier to determine which network work (NF) instances (e.g. AMF and SMF) are serving this specific UE, further filter them according to the provided S-NSSAI and network function types using data collected from NRF or OAM, and provide analytics for these network function instances. If the UE information is masked, the monitoring system and NWDAF could use the encrypted value for the subscriber information during search and drill-down processes or maybe other information such as event occurrence time or other NFs IDs to trace the error cause and obtain additional analytics. The monitoring solution could also use the same encryption algorithm for the NWDAF in transforming analytics and also to conduct search through probing system. The subscriber information may be stored in encrypted format in the data unit for more secure preservation of captured data.

It should be noted that multiple 5G cores (e.g. slice based type) may be operational at the same time. The information collected from various NWDAFs or probes may be correlated to show all UE associated sessions and requests to explore whether an error is occurring from the UE side and/or the network side. The correlation may also be used to identify if the error caused by cloud associated events or originated from the telecom system. This allows full visibility to the cloud-based core network system from telecom and cloud system perspectives. The data processing described herein may include (1) processing of real time counters captured from the probes and real-time analytics to identify the current error cause (2) using probe data history to predict anomalies in the network in the next status changes.

The monitoring solution may employs artificial intelligence (AI) in the processing unit that could be also used as the AI for the NWDAF. This will reduce the complexity of using multiple learning systems and also allow the users to insert new algorithms or learning machines that can support new use cases and prediction abilities.

The processing unit 36 correlates the data obtained from the capture units to detect and measure customer-impacting events in real time. The processing unit 36 can be used to determine who is impacted, where and for how long. The processing unit 36 can be used to diagnose the root cause of issues so they can be rapidly resolved, as discussed further below.

The processing unit 36 consumes the counters and analytics IDs stored in the data unit 35. Data from capture units (the CP probe 31, UP probe 32 and active probe NF 33) are ingested into the data unit 35 and made available to the processing unit 36.

Obtained analytics are processed to detect anomalies, using:
  Counters, KPIs or KQIs
  Filtering a subset of data (e.g. subscribers)
  Alarm thresholds
  Certain sets algorithms that merge combinations of KPIs and thresholds The one or more dashboards 37 can be used to provide visualizations of network status and alarms to users along with the ability to configure the monitoring system.

The probe network function 33 subscribes to the NWDAF of the service based architecture (SBA) of the 5G communications network 34. The probe network function can be configured in a number of ways, as discussed further below.

Figure 5:
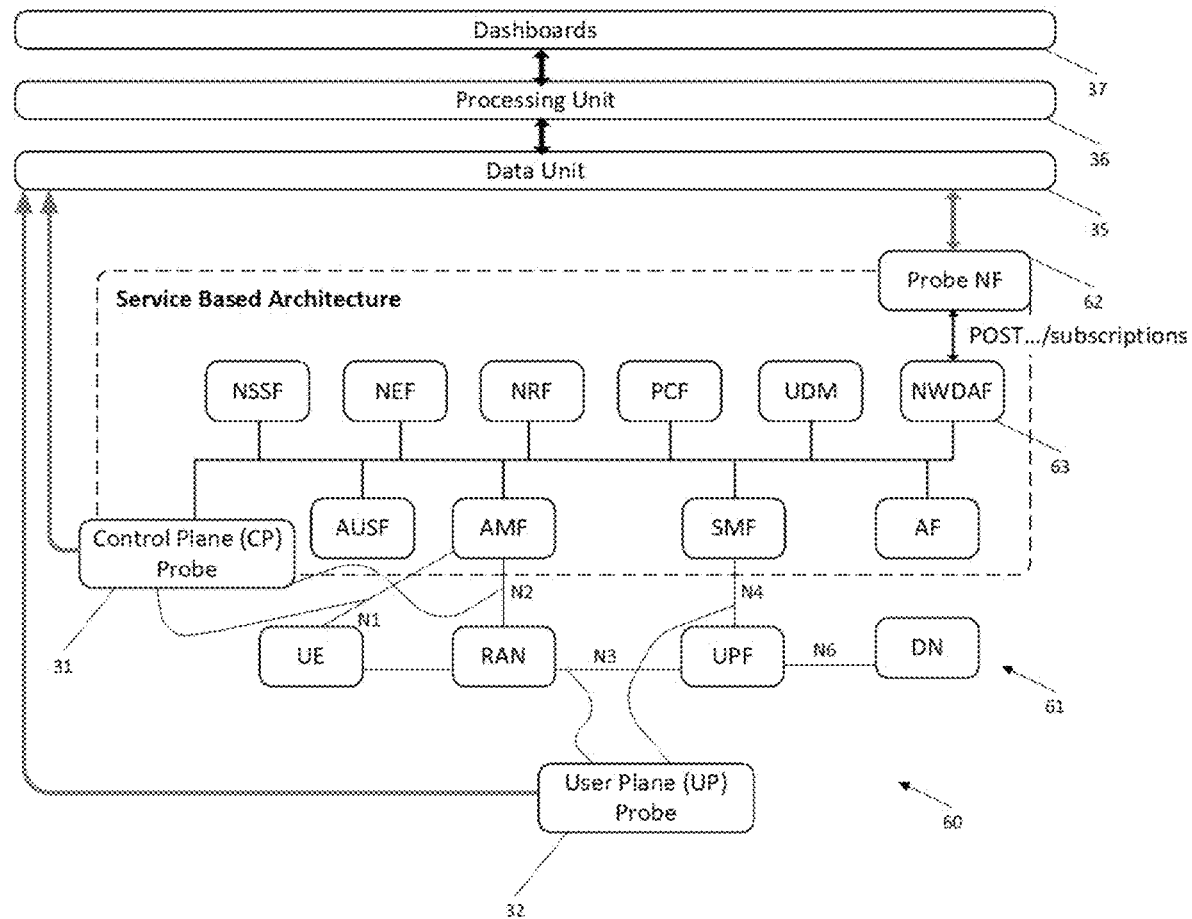

FIG. 5 is a block diagram of a system, indicated generally by the reference numeral 60, in accordance with an example embodiment. Since operators may create NWDAFs for certain sets of KPIs or network segments, or in smaller domains and datacenters, operators may allow instantiation of an active probe network function within their clouds in order to subscribe directly to an NWDAF. Such as arrangement is shown in the system 60.

The system 60 comprises a 5G network 61 (similar to the network 34), and includes the data unit 35, processing module 36 and one or more dashboards 37 of the system 30. The system 60 further comprises a 5G probe network function 62.

The probe network function 62 obtains analytics data by receiving messages from the network data analytics function NWDAF 63 of the 5G network 61. The probe network function 62 may subscribe to the relevant NWDAF(s) and the subscribed NWDAFs may send messages (e.g. Nnwdaf_event_subscription_Notify messages) to the probe network function 62. (Note that multiple probe network functions 62 may be provided for receiving messages from multiple NWDAFs 63.). The Nnwdaf_event_subscription_Notify message is defined in the 3GPP TS 29.520 version 15.3.0 Release 15, section 4.2.2. In live network deployments, the probe NF 62 may need to obtain a token-based authentication to access NWDAF services and use secured interfaces with TLS1.3 during message exchanges. Also, the connectivity between monitoring solution components may also be secured by TLS1.3 encryption to comply with 5G and beyond security requirements.

Each message sent from an NWDAF 63 to the network function 62 may include data such as slice identity, instance identity and load level data. Thus, the probe network function 62 can subscribe to the NWDAF(s) 63 in order to capture slice analytics, thereby implementing operation 21 of the method 20.

As shown in FIG. 5, control plane probes 31 are used to obtain control plane data from the N1/N2 and SBA or SBI interfaces and user plane probes 32 are used to obtain user plane data the N3 and N4 interfaces, as discussed above with reference to the signaling diagram 100 (thereby implementing operation 22 of the method 20).

Figure 6:
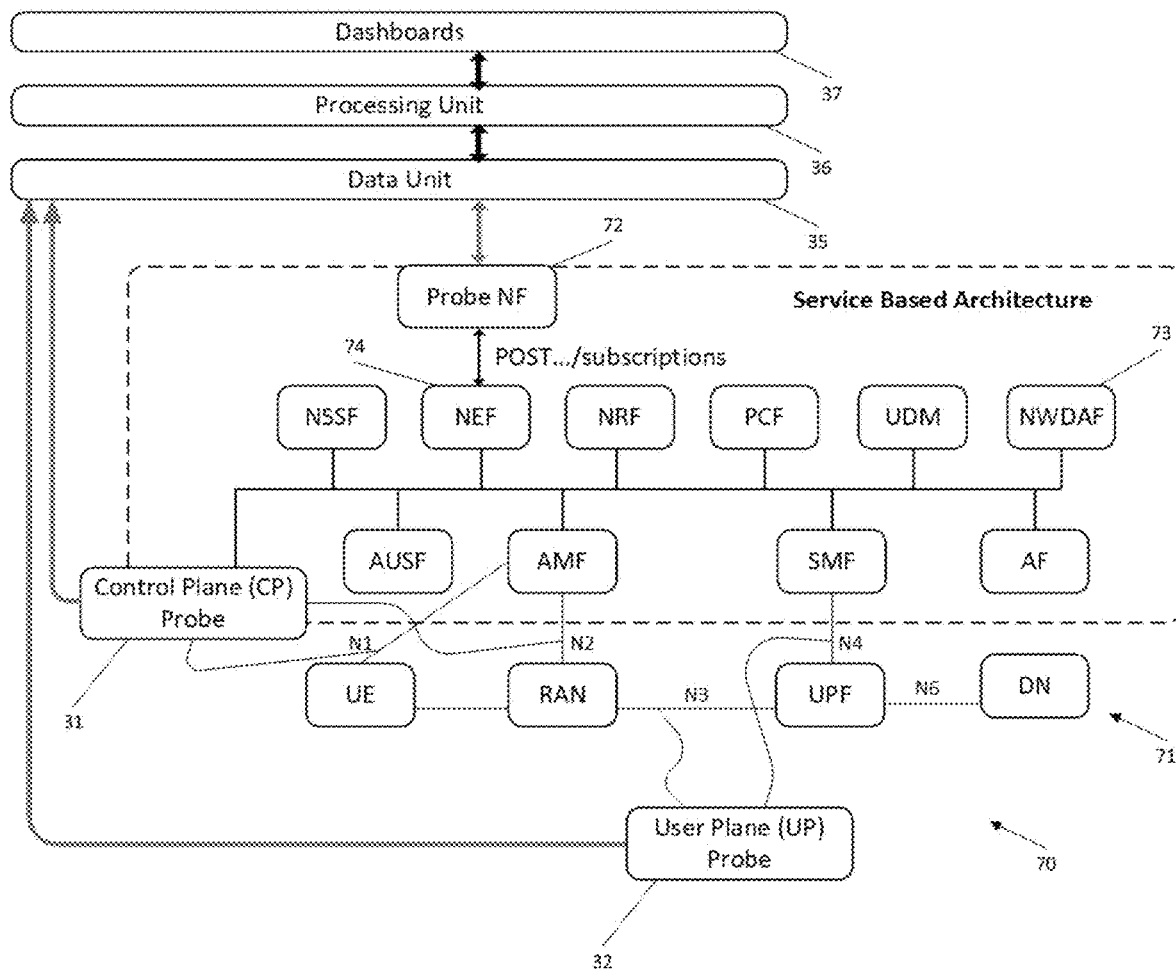

FIG. 6 is a block diagram of a system, indicated generally by the reference numeral 70, in accordance with an example embodiment. In bigger domains, operators may wish to restrict direct association with core network functions, such that access to the NWDAF may be achieved through a network exposure function (NEF). This could be a requirement from some operators to maintain higher security and shield their cores from third party applications. This scenario can also happen when an analytics application subscribes to the main central cores of the network. Such a scenario is shown in FIG. 6.

The system 70 comprises a 5G network 71 (similar to the networks 34 and 61), and includes the data unit 35, processing module 36 and one or more dashboards 37 described above. The system 70 further comprises a 5G probe network function 72.

The probe network function 72 obtain analytics data by receiving information about events from the one or more network data analytics functions from a network exposure function (NEF) 74 of the 5G network 71. The probe network function 72 may subscribe to the relevant NWDAFs 73 of the network 71 through the NEF 74 and the NEF may send messages (e.g. Nnwdaf_event_subscription_Notify messages) to the probe network function 72. Thus, the probe network function 72 is able to capture slice analytics via the NEF 74, thereby implementing operation 21 of the method 20.

As shown in FIG. 6, control plane (CP) probes 31 are used to obtain control plane data from the N1/N2 and SBA or SBI interfaces and user plane (UP) probes 32 are used to obtain user plane data the N3 and N4 interfaces (thereby implementing operation 22 of the method 20).

Figure 7:
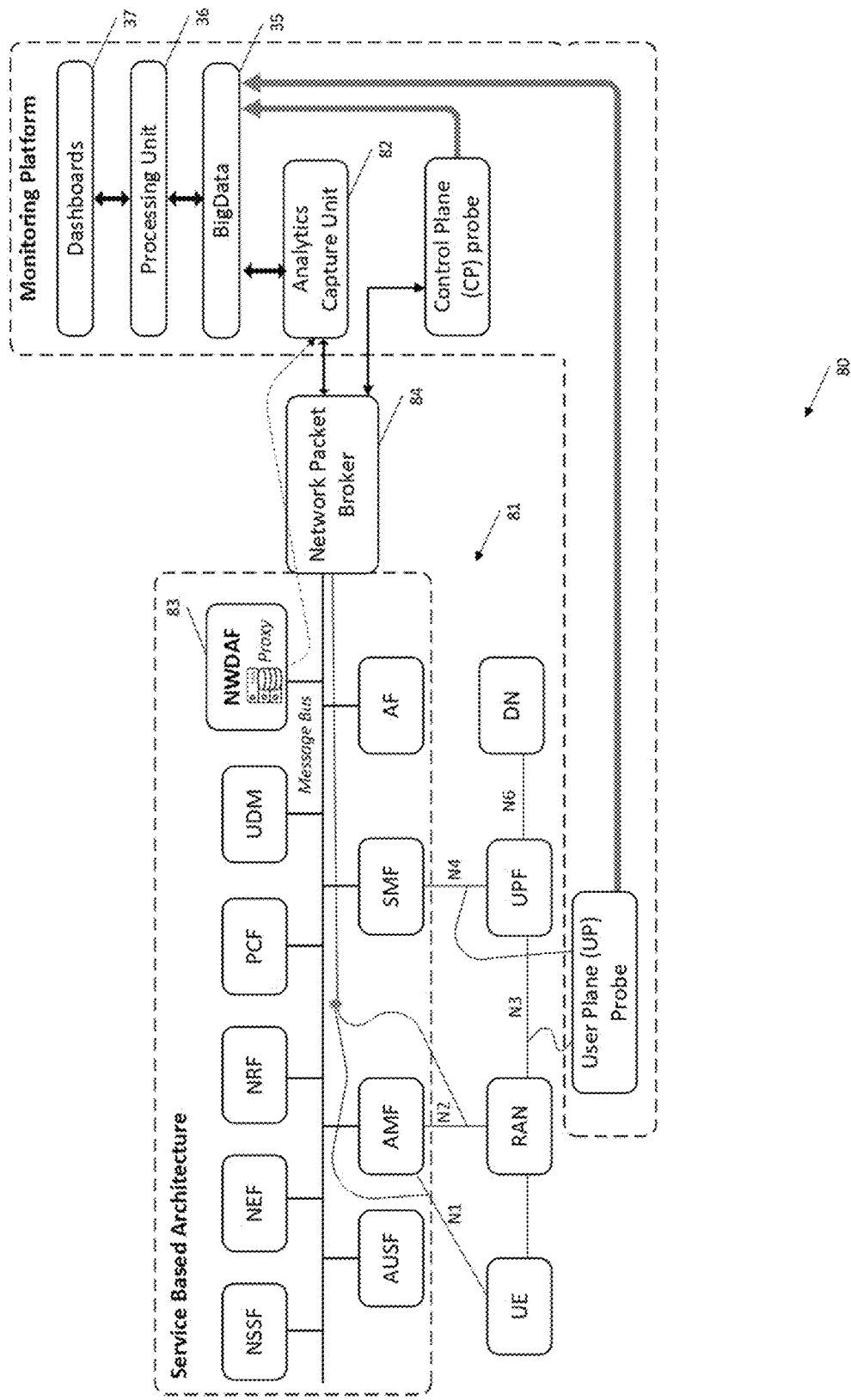

FIG. 7 is a block diagram of a system, indicated generally by the reference numeral 80, in accordance with an example embodiment. In smaller domains or lab testing, we may interface to an NWDAF using a physical packet broker (e.g. a switch board) from outside the network. This may also happen when the operator wants to limit external access to their cores. Such a scenario is shown in FIG. 7.

The system 80 comprises a 5G network 81 (similar to the networks 34, 61 and 71), and includes the data unit 35, processing module 36 and one or more dashboards 37 described above. The system 80 further comprises an analytics capture unit 82 that captures analytics sent by a proxy function in NWDAFs 83 through a network packet broker 84.

The choice to use a network broker scenario may be driven by the fact that operators may restrict their network infrastructure from being accessed by 3rd parties (including monitoring tools). The network packet brokers may also be used in a lab testing to simplify the procedures of service verification.

As shown in FIG. 7, the network packet broker 84 is used to send all the messages from the control plane of said mobile communication system to the control plane probe. The network packet broker may be a customer packet broker and may be used to connect to the internal core message bus of the 5G network or the CNI plugin through a NIC interface.

In the system 80, control plane probes are used to obtain control plane data from the N1/N2 and SBA or SBI interfaces and user plane probes are used to obtain user plane data the N3 and N4 interfaces (thereby implementing operation 22 of the method 20).

In the system 80, the control plane probes, user plane probes, analytics capture unit 82, data unit 35, processing unit 36 and dashboard 37 may collectively form a monitoring platform.

In the systems 30, 60, 70 and 80 described above, a single NWDAF is shown within the communication network. However, there could be multiple NWDAFs depending, for example, on the number of cores. Also, operators may create an NWDAF for specific set of analytics or network segment. The probe network functions described herein can communicate with any NWDAF and collect analytics depending on the use case.

In the systems 30, 60, 70 and 80 described above, the NWDAF(s) form part of a service-based architecture. The 5G communication system can also be configured as a reference point architecture (e.g. when used for voice calls). Some example reference point architecture embodiments are discussed below.

Figure 8:
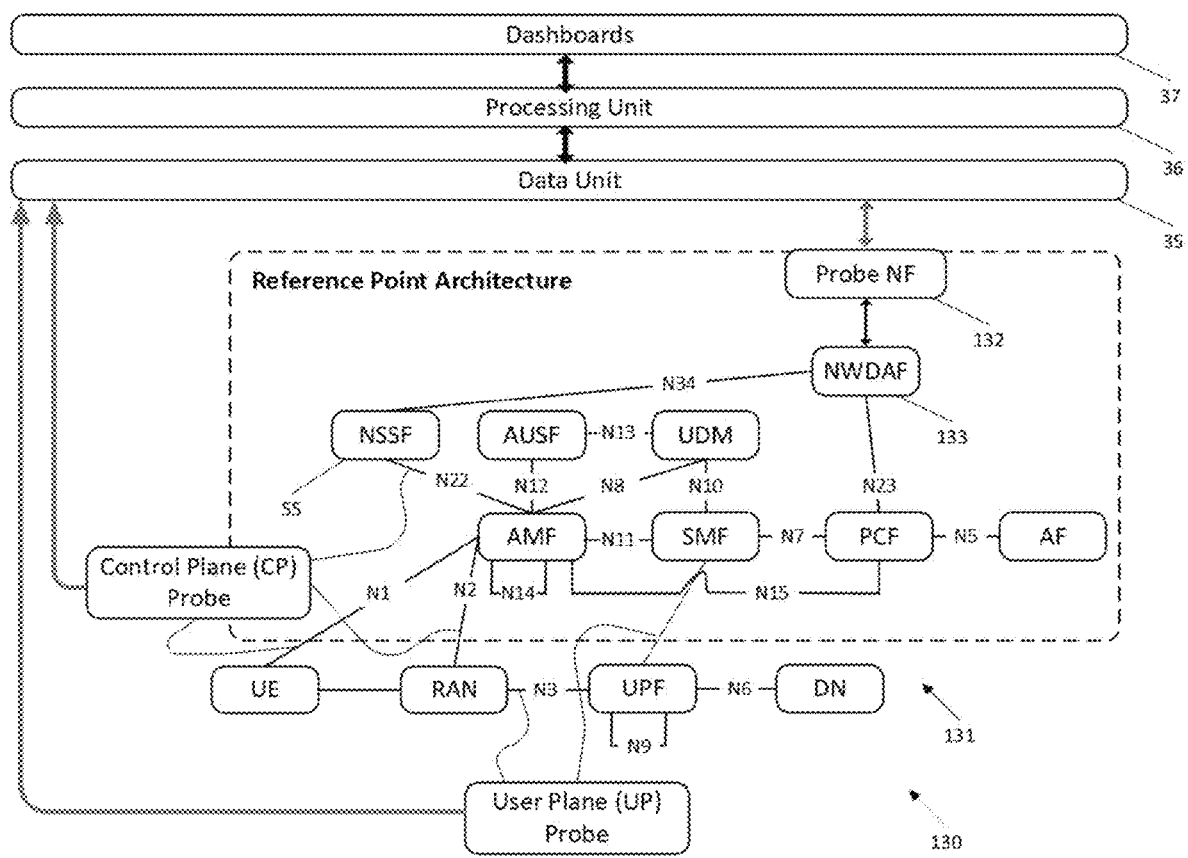

FIG. 8 is a block diagram of a system, indicated generally by the reference numeral 130. The system 130 has many similarities with the systems 30 and 60 described above. The system 130 is an example implementation of the system 10 and may be used to implement the method 20 and the signaling described above with reference to the signaling diagram 100.

The system 130 includes a 5G network 131 operating as a reference point architecture.

The system 130 comprises a control plane (CP) probe, a user plane (UP) probe and an active probe network function 132 that collectively form a capture unit (such as the capture unit 12 described above). The system 130 further comprises the data unit 35, processing module 36 and one or more dashboards 37 described above.

The 5G probe network function 132 is similar to the network function 33 of the system 30. The active probe network function 132 obtains analytics from one or more Network Data Analytics Functions Services (NWDAFs) 133. The network function 132 may issue requests to an NWDAF to provide a set of analytics, a report on analytics period, or other types of analytics.

In a similar manner to the system 30, the control plane (CP) probe mirrors all packets on N1/N2 and can decipher the NAS to enrich the obtained data with obtain subscriber information. The control plane probe generates call data records (CDRs) that are ingested into the processing unit for troubleshoot any issue on the network and to identify its root cause. The CP probe can also obtain all messages from SBI interfaces for full monitoring of the SBA domain. Although the figure shows one probe that monitors all interfaces, smaller dedicated probes may be instantiated to capture a single interface or a certain set of interfaces. The user plane (UP) probe generates evolved session data records (eSDRs) that are ingested into the processing unit 36 for troubleshooting issues on the network 131 and to identify root causes. IF UPF became part of SBA, then the UP probe may obtain N4 information through a separate enrichment interface from the CP probe.

Figure 9:
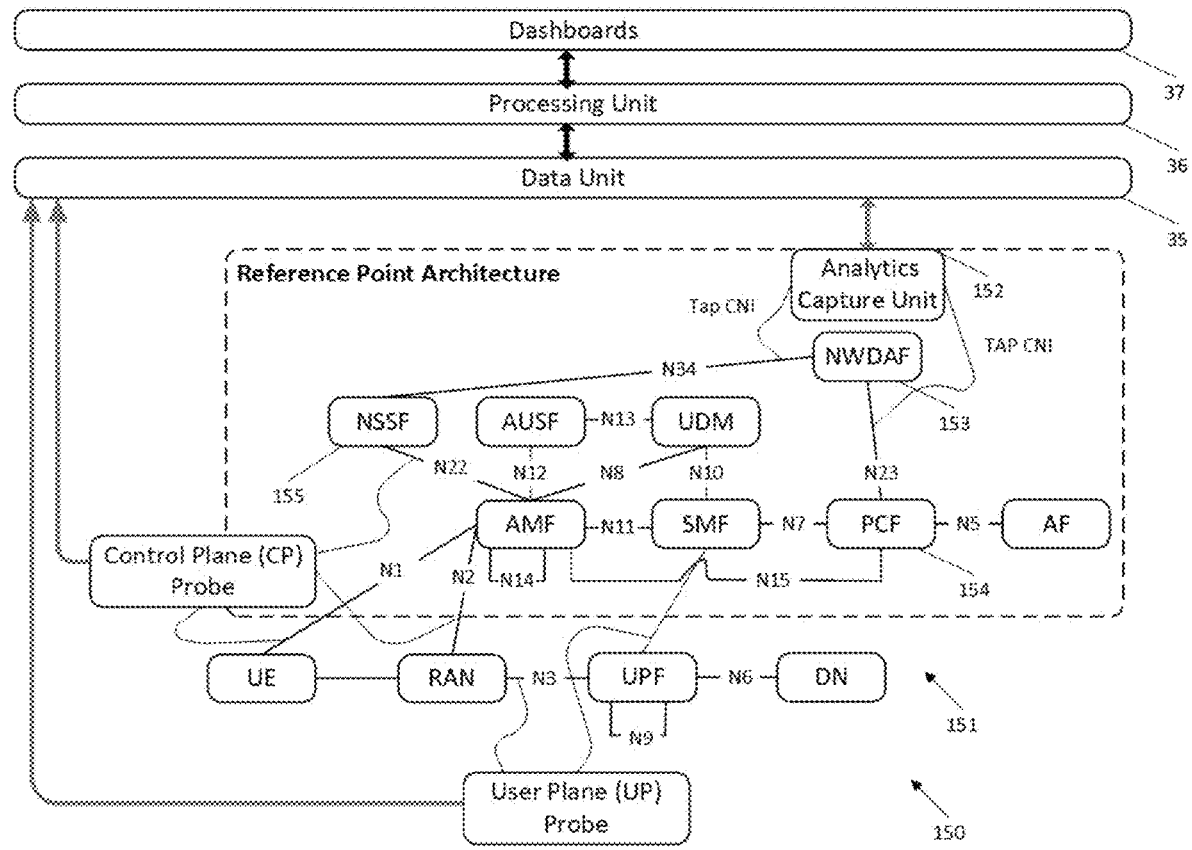

FIG. 9 is a block diagram of a system, indicated generally by the reference numeral 150, in accordance with an example embodiment. The system 150 has many similarities with the system 130 described above.

This scenario of FIG. 9 can be adopted when operators allow a monitoring tool provider to instantiate the probe NF in their clouds to coexist with other 5G core components.

The system 150 comprises a 5G network 151 (similar to the network 131) configured as a reference point architecture, and includes the data unit 35, processing module 36 and one or more dashboards 37 of the systems 30 and 130. The system 150 further comprises an analytics capture unit 152 that performs a similar function to the 5G probe network function 132 of the system 130.

The analytics capture unit 152 taps into the N23 interface of the 5G network 151 (e.g. by mirroring the traffic in a cloud-native domain) to obtain network data analytics function data sent from one or more network data analytics functions (NWDAFs) 153 to a policy control function (PCF) 154 of the mobile communication system. Similarly, the analytics capture unit 152 taps into the N34 interface of the 5G network to obtain network data analytics function data (e.g. slice analytics) sent from the one or more NWDAFs 153 to a network service slice function (NSSF) 155 of the mobile communication system. In this way, analytics data may be provided to the processor 36, thereby implementing the operation 21 of the method 20 described above. This scenario is based on monitoring messages from the NWDAF and does not support active mode for requesting subsets of analytics.

As shown in FIG. 9, control plane probes are used to obtain control plane data from the N1 and N2 and SBI or SBA interfaces and user plane probes are used to obtain user plane data the N3 and N4 interfaces (thereby implementing operation 22 of the method 20).

Figure 10:
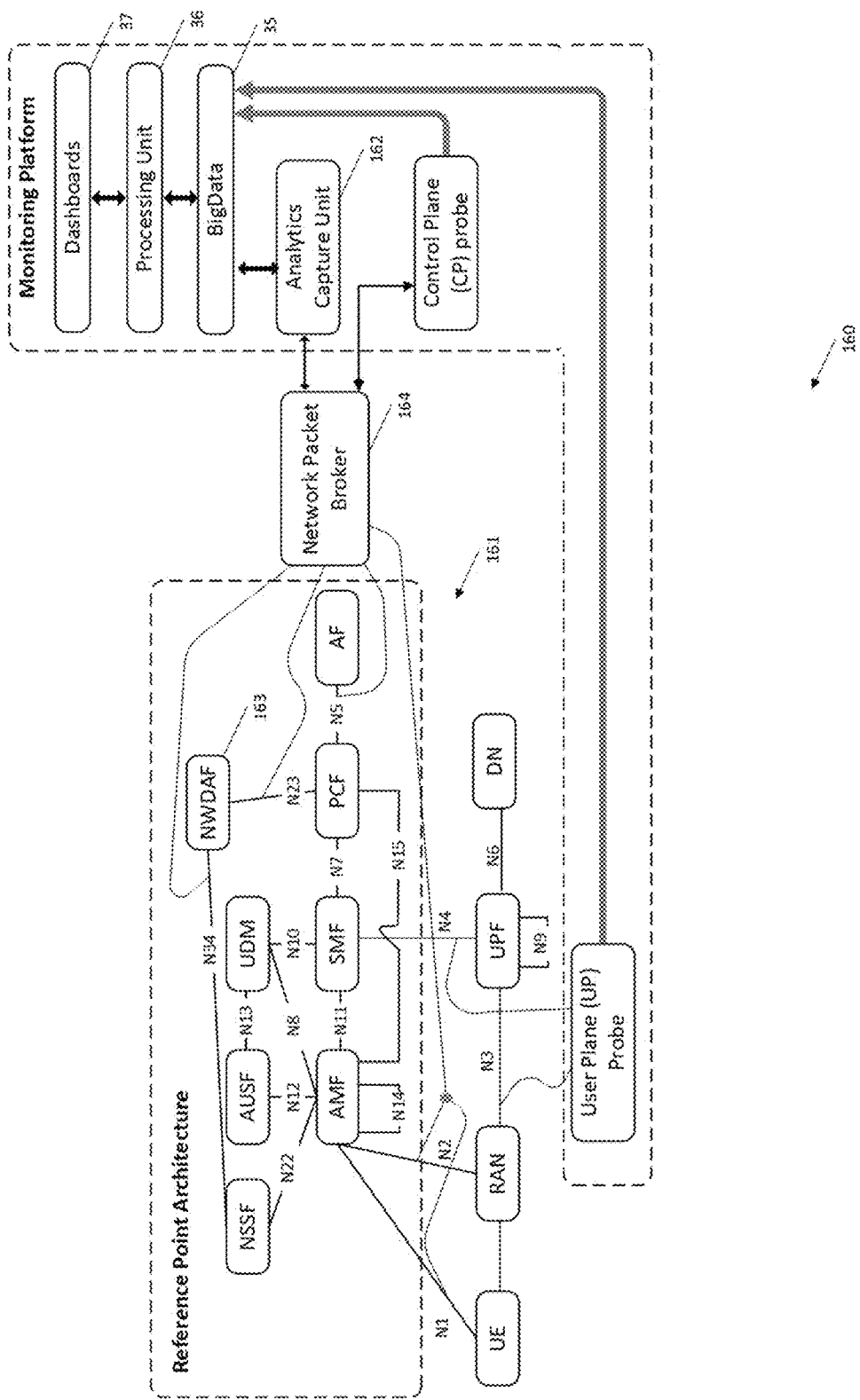

FIG. 10 is a block diagram of a system, indicated generally by the reference numeral 160, in accordance with an example embodiment. The system 160 has many similarities with the system 80 described above.

The system 80 comprises a 5G network 161 operating as a reference point architecture, and includes the data unit 35, processing module 36 and one or more dashboards 37 described above. The system 160 further comprises an analytics capture unit 162 (similar to the analytics capture unit 82 described above) that subscribes to one or more NWDAFs 163 through a network packet broker 164. The analytics capture unit 162 captures slice analytics via the network packet broker 164.

As shown in FIG. 10, data analytics are obtained by the analytics capture unit 162 by extracting (using the packet broker 164) said analytics data from communications sent from said one or more network data analytics functions 163 to the capture unit using the front panel ports of the network broker. The network packet broker 164 can be in the form of proprietary hardware or virtual component that is connected to monitoring tool through network interface cards (NICs) or virtual switches. In some example embodiments, no active mode is supported for this scenario.

As shown in FIG. 10, control plane probes are used to obtain control plane data from the N1/N2 and SBA or SBI interfaces and user plane probes are used to obtain user plane data the N3 and N4 interfaces (thereby implementing operation 22 of the method 20).

In the system 160, the control plane probes, user plane probes, active probe network function 162, data unit 35, processing unit 36 and dashboard 37 may collectively form a monitoring platform.

Figure 11:
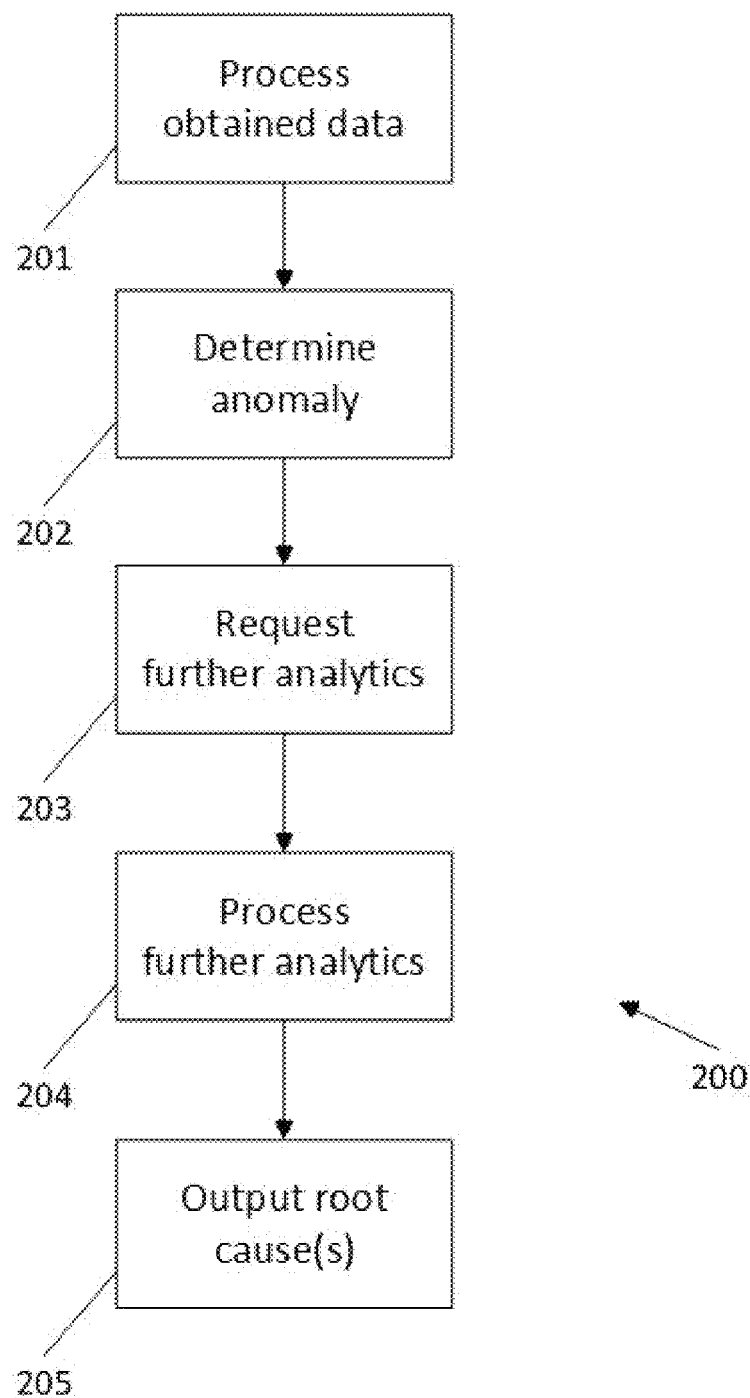
FIG. 11 is a flow chart showing a method in accordance with an example embodiment.

FIG. 11 is a flow chart showing a method, indicated generally by the reference numeral 200, in accordance with an example embodiment.

The method 200 starts at operation 201, where analytics data obtained using the embodiments described above is processed (e.g. using the processing unit 36). The analytics data may include some or all of the analytics data obtained in operation 22 (e.g. including KPIs along with subscriber information obtained from one or more NWDAFs), the control plane data and the user plane data obtained in operation 24. The operation 201 may be implemented using a machine-learned algorithm.

At operation 202, one or more anomalies are identified based on the data processed in operation 201. By way of example, actual or potential anomalies may be identified by identifying differences between at least some of the analytics data, user plane data and control plane data described above.

In one example embodiment, the operation 202 determines a source of an identified anomaly (e.g. an actual or potential anomaly). The source may be a location of the anomaly, such as which core or NF, whether or the UE side or network side etc. This precise identification may be enabled though monitoring the telecom system using CP and UP probes as well as cloud domain and NF status using NWDAF analytics.

At operation 203, further data is requested. For example, further information may be requested regarding an anomaly determined in the operation 202. Thus, for example, further data regarding the source of the anomaly may be requested.

In one example, embodiment, the processing unit 36 may request further information from one or more network data analytics functions (NWDAFs). Such further information may be specific information in response to the identification of the anomaly.

For example, a certain set of analytics for a subscriber and associated 5G core network functions may be requested in the operation 203. The obtained analytics may allow the definition of the topology and all involved network functions in that session to diagnose the cause of an anomaly (e.g. an error). This enables the system to act as an active solution that can make a series of inspections to define an exact fault point.

At operation 204, the further data is processed (e.g. using a machine-learning algorithm). The operation 204 may, for example, identify a root cause of the anomaly.

Finally, at operation 205, a root cause (or some other output of the method 200) is output. The output may be provided to the dashboard 37 described above. The root cause may be defined as which network function and associated topology caused an identified anomaly.

The operation 205 may include creating a relevant network topology map using a subset of analytics data and obtained control plane data and user plane data and then determining a root cause of said at least one anomaly using said subset of analytics data and said network topology map.

As described above, the NF probe may be able to operate as a passive monitoring tool component or an active monitoring tool component. In one example embodiment, the operation 201 processes data obtained when the network function is operating as a passive network function and the operation 204 processes data obtained when the NF probe operates as an active network function.

In a passive mode, the probe network function subscribes to one or more NWDAFs to obtain all available analytics and ingest them into the processing unit 36.

In the active mode, once a network error has been identified by the processing unit 36, certain analytics sets are requested by the network function from the NWDAF(s) (in the operation 203). The processing unit 36 may send this request in form of commands provided with certain information such as subscriber information (e.g. International Mobile Subscriber Identity (IMSI) for non-masked systems or other information (e.g. encrypted IMSI format, time frame, etc.) for masked secure systems. Then, the NWDAF may use identification information to determine which network function (NF) instances (AMF and SMF) are serving this specific UE, filter them based on slice type (e.g. Single Network Slice Selection Assistance Information, S-NSSAI) and associated network function types using data collected from NRF, and provide analytics for these network function instances.

It should be noted that network functions (NF) in 5G systems are not necessarily single components. In fact, there are typically multiple instances of SMFs and AMFs and other associated network functions. These functions may be chained sequentially in a complicated mesh network. Thus, the operations 203 and 204 may be provided to enable further analysis of data to determine the source of an anomaly.

Many variants of the method 200 are possible. For example, the operations 203 and 204 may be omitted, such that the output (e.g. the likely root cause) is generated based on the data processed in the operation 201.

Figure 12:
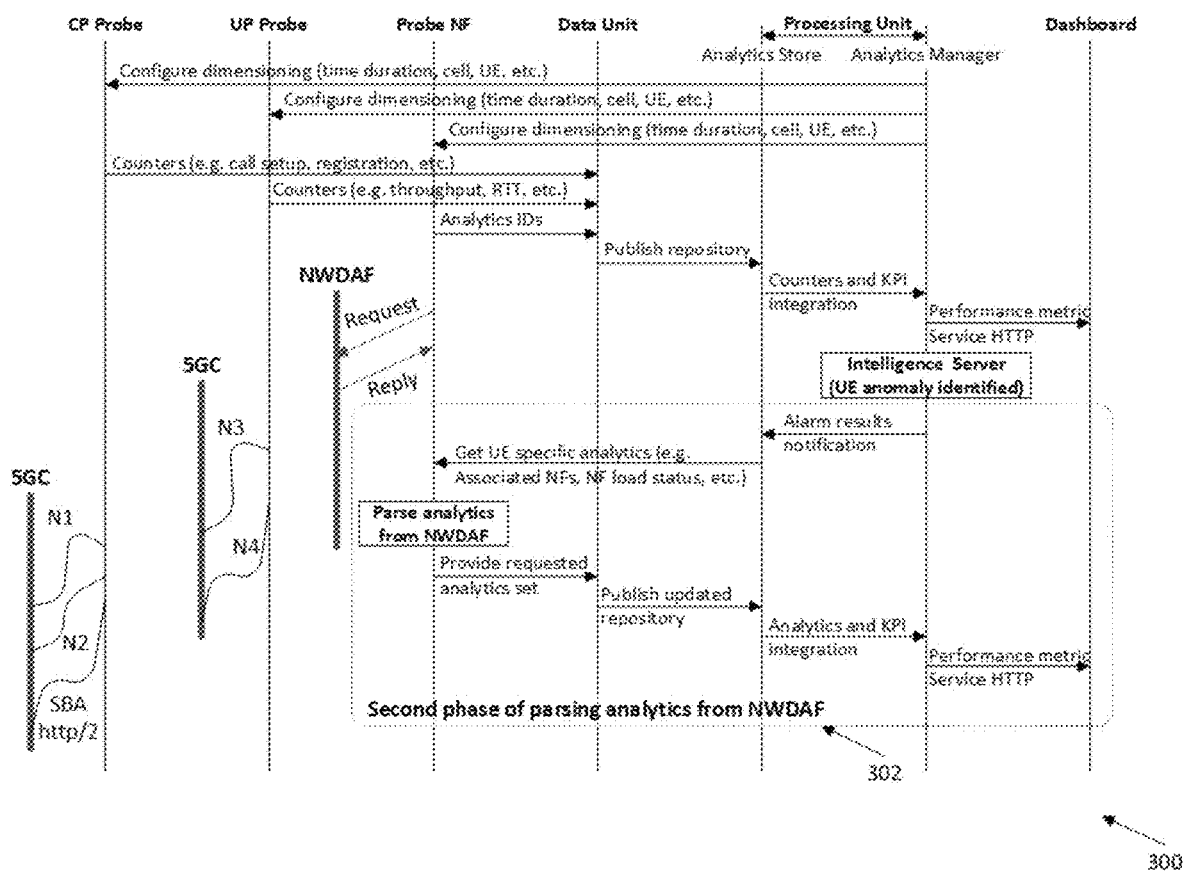
FIG. 12 is a signaling diagram in accordance with an example embodiment.

FIG. 12 is a signaling diagram, indicated generally by the reference numeral 300, in accordance with an example embodiment. The signaling diagram 300 shows signaling between a control plane (CP) probe, a user plane (UP) probe, a probe network function (NF), a data unit, an analytics store, an analytics manager and a dashboard and includes the messages of the signaling diagram 100 described above.

In addition, the signaling diagram 300 shows a second phase 302 following the collection of data analytics.

The second phase 302 is trigged by the analytics manager (or some other part of the data processor 36) identifying an anomaly (thereby implementing the operation 202 of the method 200). On detection of an anomaly, an alarm results notification is sent to the analytics store of the data processor 36.

In order to implement the operation 203 of the method 200, the data processor 36 sends a request for specific analytics data to the probe network function. The NWDAF analytics are parsed and the requested analytics provided to the data unit and then published to the analytics store.

The data processor processes the further analytics (thereby implementing the operation 204 of the method 200) and sends performance metrics to the dashboard, for example for presentation to a user.

The 5G core and much of the 5G data traffic are encrypted (e.g. using TLS1.3). Although monitoring solutions may integrate certain sensors that enable real-time encryption at the capture unit, those keys may change during the session causing inconsistency in capture traffic. The NWDAF analytics could provide an alternative source of data in the intervals when monitoring solution is not able to decipher the 5G core network messages. Also, the 5G core is hosted in cloud-native domains making the core of the mobile communication system subject to the impacts Of cloud changes in computational resources and virtual instance failure. Therefore, accessing the analytics obtained by NWDAF complements the monitoring solution functionality and enrich the sets of data give to users.

The NWDAF self-analytics determination function is a virtual node supported by 5G security features to prevent unauthorized access. As described in the current 3GPP standard, the NWDAF slice congestion events notification service provides the policy control function (PCF) and network slice subset instance (NSSI) consumers with analytics information services that enforce slice core management policies. The Nnwdaf_EventsSubscription_Notify service operation is used by an NWDAF to notify network function (NF) consumers about subscribed events. If the NWDAF observes network slice related event(s) for which an NF service consumer has subscribed to, the NWDAF sends to that NF service consumer an Nwdaf_EventsSubscription_Notify request that shall include: slice ID, instance ID, and load level information, fault events, etc. These analytics are ingested into the processing unit 36 of the embodiments described above.

At least some of the example embodiments described above provide new sets of counters through direct interfacing to NWDAF. Moreover, the obtained counters from vendor-based 5GC can be correlated with passive probe counters for more comprehensive analysis of root cause, call traces, etc. Various interfaces are described above that allow subscription to NWDAF(s). The correlation between various CDS, eSDRs and NWDAF analytics allows the specification of error cause(s). Optionally, artificial intelligence (AI) may be used to judge which data is more relevant or accurate.

Thus, at least some example embodiments described herein:
Improve call trace and root cause by correlating the passive probe counters with relevant Analytics IDs (obtained from NWDAF)
Create a monitoring system for 5GC that shows events occurrence, overloaded nodes, failure occurrence, etc.
Reflect vendor analytics along with passive probe analytics
Allow more accurate evaluations of network status and diagnosis of faults.

The monitoring solutions described herein are capable of providing full visibility to the network status and error cause. This is supported by correlation of the telecom counters captured by the probes along with the analytics obtained from the NWDAF.

There may be multiple NWDAFs in the same core or domain. One central NWDAF may be provided with other dedicated NWDAFs that captures a subset of analytics or communicate with a subset of network functions (NFs). NWDAFs may be also instantiated in certain domains especially in distributed clouds where the core network functions could be segregated between the network edge and central clouds. The monitoring systems described herein will be able to access those different NWDAFs and collect data from them for full visibility of network status in end-to-end fashion.

Each NWDAF may integrate a separate data storage to store the obtained analytics. This will make the analytics system very complicated to administrate especially in large scale networks. The data unit in the monitoring solutions described herein could be the central point for all NWDAF storage that consolidates all analytics into one central unit to reduce the complexity of accessing analytics of various NWDAFs. This will also reduce the footprint for the network.

The monitoring solution data unit typically resides in the cloud but also data may be replicated on another storage on the physical hardware to maintain a backup for the monitoring system historical data on a separate domain.

The NEF is mainly used by third party applications that are accessing the core (e.g., in case of IoT slice service). Therefore, the monitoring solution described herein may use the NEF for secure access to the various cores in order to obtain NWDAF analytics.

The subscriber information may also encrypted in the monitoring solution to maintain full protection of user data in the monitoring solution. The NWDAF may mask the subscriber information and the monitoring solutions described herein may reuse the same encryption mechanism or use a universal translator to provide such functionality.

The NWDAF may provide two different types of analytics: real-time load analysis and predicted set of analytics for network and UE behavior changes. The monitoring solution captures all analytics and categories them into real-time analytics that are correlated with real counters from the probes. The predicted analytics may be placed on a separate category and processed along with counters historical data to predict future changes in network status and anomaly occurrence. The processing unit may leverage AI algorithms to support the necessary predictions with required elements for each use case.

In summary, a new interface is provided between 5GC NWDAF component(s) and an analytics platform to ingest the NWDAF data (e.g. KPIs) into a data pool. The NWDAF data can be correlated with other captured data, such as control plane and user plane data, and potentially other sources of data from 5G vendors. The combination of these data enables better analysis of 5G status and traffic fluctuations. Thus, NWDAF data can be used as an additional source of analytics that provide access to 5G slice analytics (logic network).

Additionally, in case of multiple NWDAFs, the analytics may be mapped to each individual NWDAF based on NWDAF IDs. Optionally, artificial intelligence (or other machine learning principles) can be used to determine (or verify) which analytics to select when noticing a major deviation between captured analytics from passive probe and analytics obtained from NWDAF.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, one or more processors, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

What is claimed is:

1. A network monitoring method comprising:
obtaining analytics data from one or more network data analytics functions of a mobile communication system using a probe network function which subscribes to the network data analytics functions operating in a passive mode to receive the subscribed network data analytics functions;
obtaining control plane data from one or more control plane probes, wherein the control plane data comprises signaling between one or more user devices and a network of the mobile communication system;
obtaining user plane data from one or more user plane probes;
processing the analytics data, control plane data and user plane data, including correlating at least some of said analytics, user plane and control plane data and identifying at least one anomaly in said data;
triggering an active mode by the probe network function to acquire a subset of analytics data related to said at least one anomaly;
determining one or more of (1) a root cause of said at least one anomaly using said subset of analytics data, and (2) a fault point of said at least one anomaly by inspecting said subset of analytics data; and
subsequent to determining the one or more of the root cause and the fault point, returning to operating the probe network function in the passive mode.

2. A method as claimed in claim 1, further comprising:
creating a relevant network topology map using said subset of analytics data and said obtained control plane data and user plane data; and
determining the root cause of said at least one anomaly using said subset of analytics data and said network topology map.

3. A method as claimed in claim 1, wherein processing said analytics data, control plane data and user plane data includes using one or more machine-learned algorithms.

4. A method as claimed in claim 1, wherein identifying said at least one anomaly comprises identifying differences between at least some of the analytics data, user plane data and control plane data indicative of an anomaly.

5. A method as claimed in claim 1, further comprising providing processed analytics data, control plane data and user plane data to a dashboard.

6. A method as claimed in claim 1, further comprising determining which users were impacted by said at least one anomaly.

7. A method as claimed in claim 1, wherein:
obtaining analytics data comprises receiving analytics IDs;
obtaining control plane data comprises receiving call data records; and/or
obtaining user plane data comprises receiving evolved session data records.

8. A method as claimed in claim 1, further comprising providing the obtained analytics data, control plane data and user plane data to a data pool for processing.

9. A method as claimed in claim 1, wherein obtaining said analytics data includes receiving messages from one or more of said network data analytics functions.

10. A method as claimed in claim 9, wherein each message includes slice identity, instance identity and load level data.

11. A method as claimed in claim 1, wherein obtaining said analytics data includes receiving information about events from the one or more network data analytics functions from a network exposure function.

12. A method as claimed in claim 1, wherein obtaining said analytics data includes extracting said analytics data from communications sent from said one or more network data analytics functions to other modules of the mobile communication system over an internal core messaging bus.

13. A method as claimed in claim 12, further comprising identifying analytics data on the core messaging bus.

14. A method as claimed in claim 1, wherein obtaining said analytics data includes obtaining network data analytics function data sent from the one or more network data analytics functions to: a policy control function of the mobile communication system and/or a network service slice function of the mobile communication system.

15. A method as claimed in claim 1, wherein said one or more control plane probes obtain said control plane data from one or more of N1/N2, SBA and SBI interfaces of said mobile communication system.

16. A method as claimed in claim 1, wherein said one or more user plane probes obtain said user plane data from one or more of N3 and N4 interfaces of said mobile communication system.

17. An apparatus comprising a data processor for processing analytics data, control plane data and user plane data of a mobile communication system, including correlating at least some of said analytics, user plane and control plane data, identifying at least one anomaly in said data and triggering an active mode by a probe network function to acquire a subset of analytics data related to said at least one anomaly, wherein:
  The analytics data are obtained from one or more network data analytics functions of the mobile communication system using the probe network function which subscribes to the network data analytics functions operating in a passive mode to receive the subscribed network data analytics functions;
  the control plane data are obtained from one or more control plane probes, wherein the control plane data comprises signaling between one or more user devices and a network of the mobile communication system;
  the user plane data are obtained from one or more user plane probes;
  the data processor is further configured to determine one or more of (1) a root cause of said at least one anomaly using said subset of analytics data, and (2) a fault point of said at least one anomaly by inspecting said subset of analytics data; and
  subsequent to determining the one or more of the root cause and the fault point, the probe network function is returned to operate in the passive mode.

18. A non-transitory computer-readable medium comprising instructions for causing an apparatus to perform at least the following:
  obtain analytics data from one or more network data analytics functions of a mobile communication system using a probe network function which subscribes to the network data analytics functions operating in a passive mode to receive the subscribed network data analytics functions;
  obtain control plane data from one or more control plane probes, wherein the control plane data comprises signaling between one or more user devices and a network of the mobile communication system;
  obtain user plane data from one or more user plane probes;
  process the analytics data, control plane data and user plane data, including correlating at least some of said analytics, user plane and control plane data and identifying at least one anomaly in said data;
  trigger an active mode by the probe network function to acquire a subset of analytics data related to said at least one anomaly; and
  determining one or more of (1) a root cause of said at least one anomaly using said subset of analytics data, and (2) a fault point of said at least one anomaly by inspecting said subset of analytics data,
  wherein both the root cause and the fault point are determined,
  wherein the root cause is determined based on a plurality of (1) identifying which network function and associated topology caused said at least one anomaly, (2) analyzing call data records (CDRs), and (3) analyzing evolved session data record (eSDRs), and
  wherein the fault point is determined based on identifying the network function caused said at least one anomaly.

19. A non-transitory computer-readable medium as claimed in claim 18, wherein the instructions further cause the apparatus to perform at least the following:
  subsequent to determining the one or more of the root cause and the fault point, returning to operating the probe network function in the passive mode.

20. A method as claimed in claim 1, wherein both the root cause and the fault point are determined,
  wherein the root cause is determined based on a plurality of (1) identifying which network function and associated topology caused said at least one anomaly, (2) analyzing call data records (CDRs), and (3) analyzing evolved session data records (eSDRs), and
  wherein the fault point is determined based on identifying the network function caused said at least one anomaly.

* * * * *